US012380635B2

(12) United States Patent
Jouet et al.

(10) Patent No.: US 12,380,635 B2
(45) Date of Patent: Aug. 5, 2025

(54) LIGHTING MODEL (71) Applicant: InterDigital CE Patent Holdings, SAS, Paris (FR)

(72) Inventors: Pierrick Jouet, Rennes (FR); Caroline Baillard, Saint Sulpice la Foret (FR); Philippe Robert, Rennes (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 206 days.

(21) Appl. No.: 18/033,153

(22) PCT Filed: Oct. 14, 2021

(86) PCT No.: PCT/EP2021/078483
§ 371 (c)(1),
(2) Date: Apr. 21, 2023

(87) PCT Pub. No.: WO2022/084149
PCT Pub. Date: Apr. 28, 2022

(65) Prior Publication Data
US 2023/0394749 A1    Dec. 7, 2023

(30) Foreign Application Priority Data
Oct. 22, 2020  (EP) .................................... 20306257

(51) Int. Cl.
*G06T 15/50*    (2011.01)
*G06T 7/70*    (2017.01)
(Continued)

(52) U.S. Cl.
CPC .............. *G06T 15/506* (2013.01); *G06T 7/70* (2017.01); *G06T 15/60* (2013.01); *G06T 19/006* (2013.01); *G06V 10/60* (2022.01)

(58) Field of Classification Search
CPC ......... G06T 7/70; G06T 15/506; G06T 15/60; G06T 19/006; G06V 10/60
See application file for complete search history.

(56) References Cited

U.S. PATENT DOCUMENTS

2020/0041261 A1 * 2/2020 Bernstein .................. F21V 1/08

FOREIGN PATENT DOCUMENTS

WO    WO 2019175057 A1    9/2019

OTHER PUBLICATIONS

Carey et al., "The Annotated VRML97 Reference Manual", Addison-Wesley Professional; OpenGL Series, Chapter 2: Key Concepts, Jun. 6, 1997, 73 pages.

(Continued)

*Primary Examiner* — Charles Tseng
(74) *Attorney, Agent, or Firm* — Condo Roccia Koptiw LLP (57) ABSTRACT Estimating lighting conditions in a mixed reality scene is a challenging task. Adding shadows cast by virtual objects in the scene contributes significantly to the user experience. To this end, there is proposed, among others, a method for an autonomously movable device having a camera. The device may move to a first position in the scene and capture a first image of a shadow of the device cast by a light source. The device may move to a second position in the scene and capture a second image of a shadow of the device cast by a light source. Features of the light source may be determined at each of the first and the second positions, and a lighting model may be determined for the scene based on the determined features of the light source in the scene.

15 Claims, 11 Drawing Sheets

(51) Int. Cl.
  *G06T 15/60*  (2006.01)
  *G06T 19/00*  (2011.01)
  *G06V 10/60*  (2022.01)

(56) References Cited

OTHER PUBLICATIONS

Laffont et al., "Rich Intrinsic Image Decomposition of Outdoor Scenes from Multiple Views", Institute of Electrical and Electronics Engineers (IEEE), IEEE Transactions on Visualization and Computer Graphics, vol. 19, Issue: 2, Feb. 2013, 17 pages.
Arief et al., "Realtime Estimation of Illumination Direction for Augmented Reality on Mobile Devices", Society for Imaging Science and Technology, 20th Color and Imaging Conference Final Program and Proceedings, Los Angeles, California, USA, Nov. 12, 2012, 6 pages.

* cited by examiner

LIGHTING MODEL

CROSS REFERENCE TO RELATED APPLICATIONS

This application is a U.S. National Stage Application under 35 U.S.C. § 371 of International Patent Application No. PCT/EP2021/078483, filed 14 Oct. 2021, which is incorporated herein by reference in its entirety.

This application claims priority to European Application No. 20306257.5, filed 22 Oct. 2020, which is incorporated herein by reference in its entirety.

TECHNICAL FIELD

The present disclosure generally relates to lighting and more particularly to lighting models for mixed and virtual reality.

BACKGROUND

Most consumer devices today can digitally capture an image or video with a single sensor which integrates light at the pixel level. However, color assessment and information is important when real scenes are mixed with computer generated items that are often of virtual nature. In mixed reality, where real and virtual objects are inserted into a stereoscopic (3D) model of a real scene, lighting of the virtual objects is a feature that provides a realistic aspect of the scene. The virtual objects should be lighted correctly by imitating the real lighting of the scene. However, lighting environment may change dynamically. Therefore, 3D lighting of a real scene is to be continuously estimated.

Unfortunately estimating accurate lighting conditions is a time-consuming task especially in mixed reality applications that deals with real-time renderings. Rendering shadows cast by the virtual objects onto the real scene is essential. Two main features contribute to the realism of the cast shadows. One is the location/orientation of the shadows and a second factor is the strength given by the attenuation of the color intensity of the shaded surface. In the case of large scenes, the problem is further exacerbated. In such scenarios, it is necessary to have a lighting model that is valid in the whole space of interest. Because of the problems inherent in modeling the physics of light transmission all lighting models provide different challenges and are approximations that are not always realistic. Consequently, techniques need to be presented that simplify this task and create realistic renderings.

SUMMARY

A method and device are provided for receiving data about lighting condition of an environment as captured by a sensor of a moving autonomous device in a first position. Data is also received about lighting condition of the environment in at least a second position. The lighting conditions of the environment is then analyzed for each position and a lighting model is generated based on lighting of the environment in the different positions for the environment.

BRIEF DESCRIPTION OF THE DRAWINGS

The teachings of the present disclosure can be readily understood by considering the following detailed description in conjunction with the accompanying drawings, in which.

DETAILED DESCRIPTION OF PREFERRED EMBODIMENTS

FIGS. 1A-1E are illustrations of different examples of an autonomous system. These examples are provided as examples and in alternate embodiments, other autonomous systems can be used with different embodiments as used for obtaining a lighting model. In classical lighting estimation models, a lighting model was often built for a local area mainly by 1) capturing the lighting environment via a camera or a lighting probe, often placed in the scene area; or 2) analyzing via a camera image, the shading and shadows cast in the observed area. In this way, the lighting model could be comprised of an environmental map defined for example by a cube map or by a set of direct lights (point lights, spotlights, directional lights, etc), each one having the following parameters: 3D pose (for the point lights or spotlights) or 3D direction (directional lights), color and intensity, and other miscellaneous and additional parameters for spotlights in particular.

The problem with such models is that the construction of lighting model is generally dependent and limited in space. One challenge is that the lighting intensity received by a scene element from a real light generally varies with distance and orientation of the light. In most cases, a light does not emit the same intensity in all its active emission directions. Moreover, numerous obstacles in the scene may occlude light. In scenarios where the area is large (case of large scenes), it is necessary to have a lighting model that is valid in the whole space of interest.

The autonomous device shown in the example of 1A is that of a domestic robot having at least one camera. In FIG. 1B a remote controlled toy is used (e.g. a car) but full size vehicles of all types that are land or water based or even amphibian and ranging in full size to miniature size can be used. In FIG. 1C a surveillance moving robot is shown and in FIGS. 1D and 1E a vacuum robot and a drone are shown respectively. In alternate embodiments, other arrangements can be provided as appreciated by those skilled in the art that are not provided by these examples. In most of these embodiments, the device is equipped with at least one camera to get information about the lighting conditions of the environment. In one embodiment, the information gathered from the environment can then be sent to other devices.

These devices can include servers, mobile devices, rendering devices such as displays and many others as can be appreciated by those skilled in the art.

In one embodiment, the initial position, and the initial rotation of the robot in the world frame is known. Odometry or lidar can be used to measure the displacement. In this embodiment, the moving domestic robot is equipped with sensors that go through a large environment selectively (a large scene) and collects data to allow for the building of a lighting model.

In one embodiment, the robot shadows as projected on the surface such as the floor in this example, can be captured by its own sensors in the building of the lighting model. The data analysis can be done by the robot itself or alternatively, the data can be sent to an external server to combine all sets of light acquired over time from this particular robot or a number of others. Subsequently, when a rendering device needs information about the lighting conditions at a specific place, then the light map acquired by the robot can be used as relevant information.

Figure 1A:
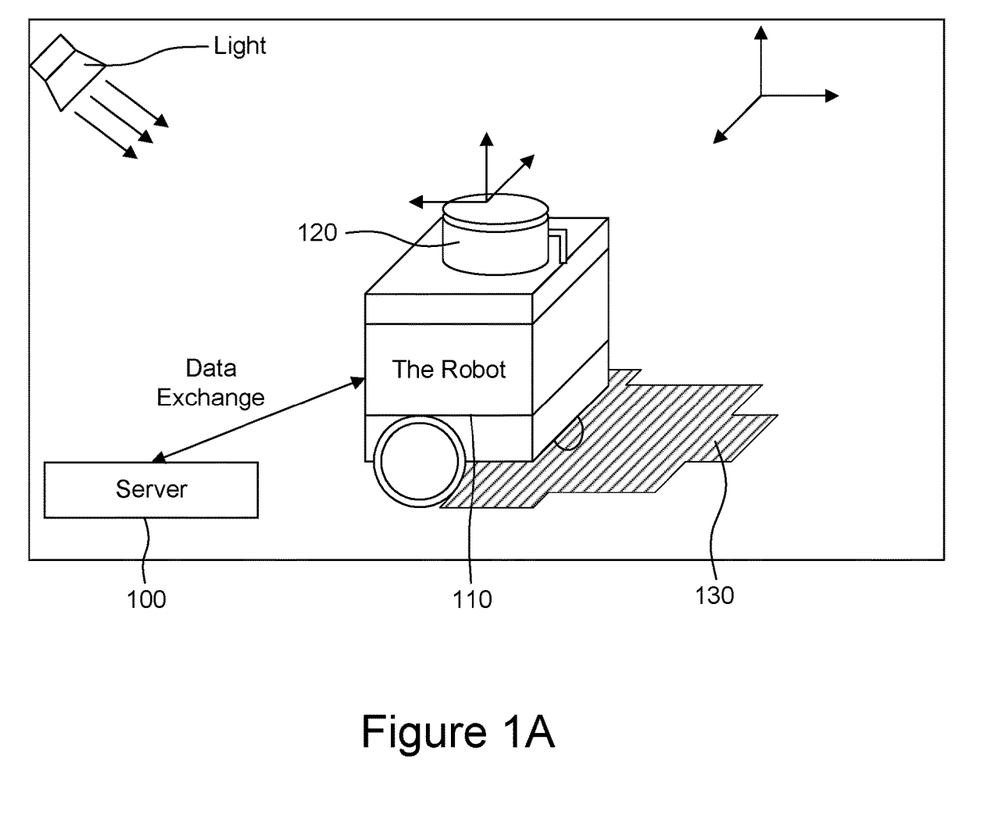
FIGS. 1A through 1E are different illustrations of an autonomous device having a camera as per alternate embodiments.
Figure 1B:
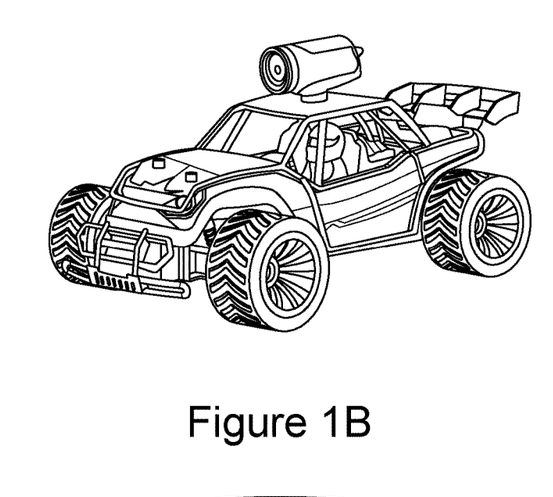
Figure 1C:
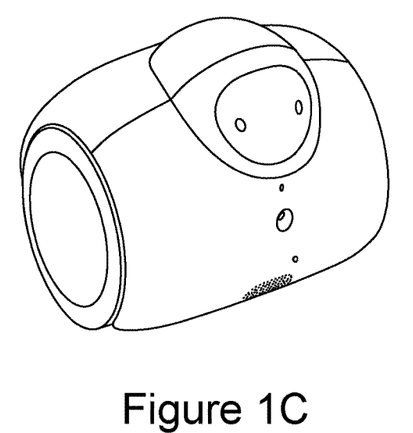
Figure 1D:
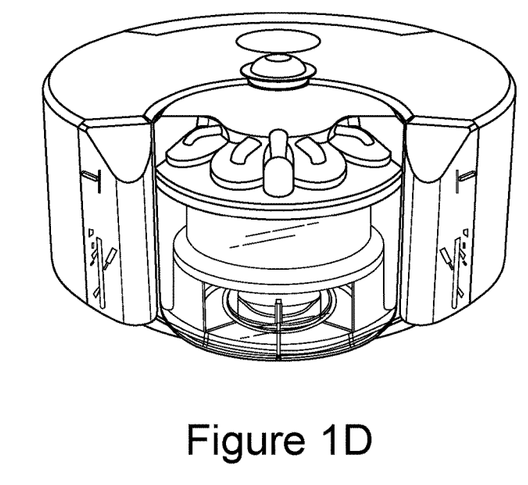
Figure 1E:
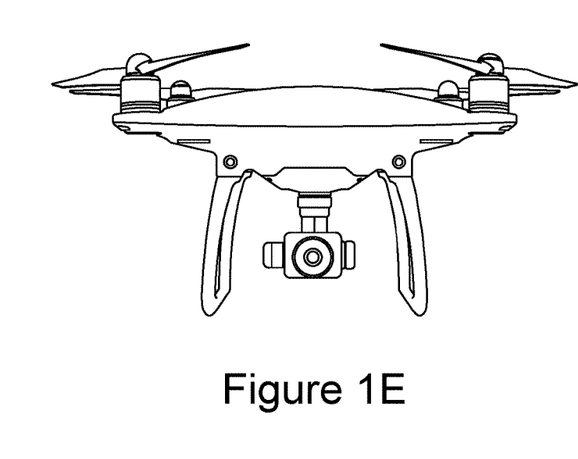

In the embodiment of FIG. 1A, the camera 120 is located on the robot 110 edge (to avoid occlusions by the robot body) and pointing downwards. The robot's three-dimensional (3D) shape and its successive poses in an external reference coordinates system (world frame) are known in this example. As the robot moves, it offers different poses (captures of the scene) and the camera captures at least one image of the surface, such as the ground here, with the possible cast shadow(s) 130 provided on that surface. The potential shadows, if there are any, are extracted from the image and provide info on local light source(s) (3D ray, intensity, color), provided in the local coordinate system of the robot (more details provided below). In one embodiment, the shadow areas can be tracked within the image sequence to increase detection robustness. When the robot moves and/or turns, a sequence of images is captured and a sequence of potential shadow(s) are detected, which provides a data set of info on the local light sources in the local robot coordinates system. In one embodiment, this can then be sent to a processor, a server or a computer system 100 (that can include a storage location) for further processing.

Figure 2A:
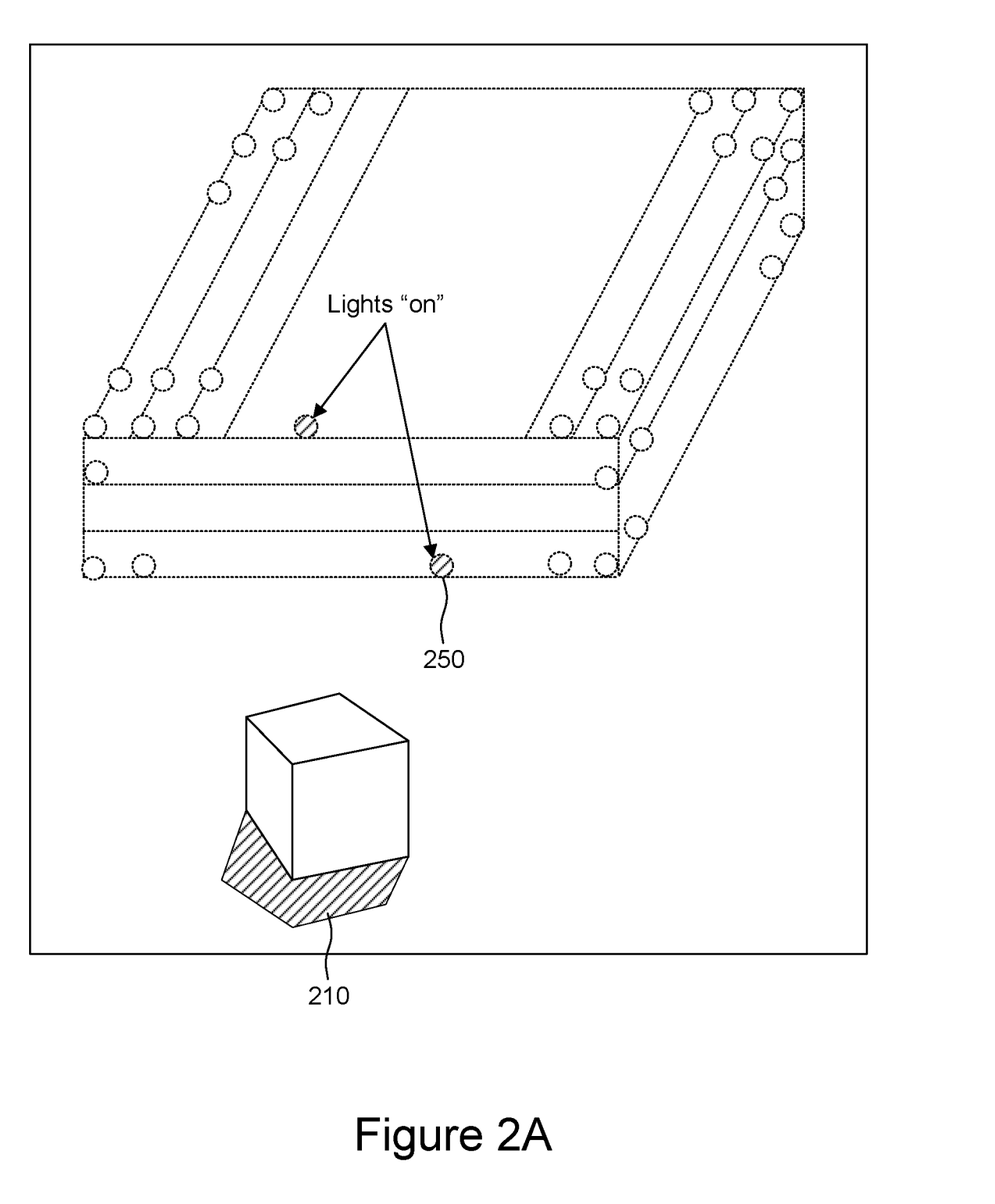
FIGS. 2A and 2B are illustration of methods for generation of shadow maps as per different embodiments.
Figure 2B:
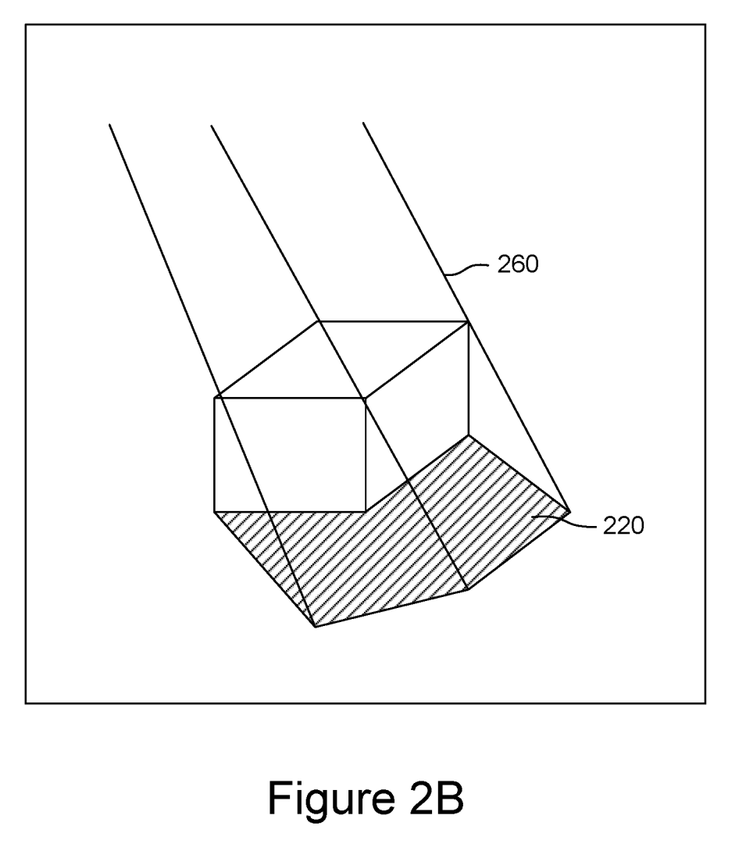

The lighting model can be built by observing the robot shape and its shadow from the camera (here attached on the robot). In one embodiment, the characteristics of the lighting including light source, color and intensity and direction (and the like), can then be analyzed to explain the characteristics of the observed shadow. This is shown in FIGS. 2A and 2B that shows the shadow produced as referenced by 210 and 220 respectively. The lights (grid of controlled lights) and their direction are also shown at 250/260 respectively.

Several methods can be used to generate shadow maps as known to those skilled in the art. Some examples can be understood by looking at FIGS. 2A and 2B. In one example, a set of candidate shadow maps can be generated from the robot 3D shape. A 3D grid of virtual lights can be used, each light is activated one after the other, shadow map and light position are stored for each light candidate. Then, using correlation process between real shadow caught by the camera and stored shadow maps, the position of the light candidate with the largest correlation is selected. In another example, the light position from shadows are developed by using or erecting a (known cuboid). In this method precision of edge extraction is important.

The sequence of light source(s) position estimates can be analyzed to robustly estimate the position of every light source. In one embodiment, before sending the data, the raw information derived from each image can be merged. For instance, a given point light will lead to consistent cues in several successive images, providing light directions intersecting at the same 3D point, with an intensity varying according to its distance to the robot. In this case, it is advantageous to combine the raw sampled light info to build a refined model, more robust, containing for instance the 3D position of the point light, as well as an intensity/impact function varying with the distance. Then this refined model can be provided to the requesting devices.

In one embodiment, this can be achieved from information (such as a set of directions), extracted from a given image. For example, from two positions of the robot in FIG. 1A, the light 3D position as the intersection of two directions can be determined. From two or more positions of the robot, the light estimated location or direction can be provided and the more images are provided the more robust is the estimation especially when the displacement of the robot is known or can easily be calculated.

The notation for homogeneous transformation matrix 4×4 is the following:

$$T = \begin{pmatrix} R & t \\ 0 & 1 \end{pmatrix}$$

Where R represents the rotation and t represents the translation.

Once the position of the robot is considered (in the world frame), the following transformation emerges:

$$^{W}T_{R}$$

And the position of a light in the robot landmark is the following transform:

$$^{R}T_{L}$$

Combined with robot positioning, all the light source positions can be converted into a common coordinate system, (the one used for the robot).

The position of the light in the world frame is the following:

$$^{W}T_{L} = {^{W}T_{R}} * {^{R}T_{L}}$$

The intent is to acquire a sequence of light directions/intensity/color corresponding to a regular sampling of the position/acquisition of the robot in a scene. A light position can be computed from two lights directions acquired with different poses.

To make the direction robust, Direction information is accumulated at different positions of the robot:

For a position R0:

$$^{W}T_{L} = {^{W}T_{R0}} * {^{R0}T_{L}}$$

For a position R1:

$$^{W}T_{L} = {^{W}T_{R1}} * {^{R1}T_{L}}$$

As a result, given a set of successive estimates for light direction, intensity and color derived from the individual sequence images, a robust estimation of the light positions/directions can be computed for the whole scene. This information can be sent as such to the server or any requesting device. The robot coordinate system is registered to the world frame used by the server or the rendering device (it can be done manually, or automatically using vision-based solutions).

Figure 3:
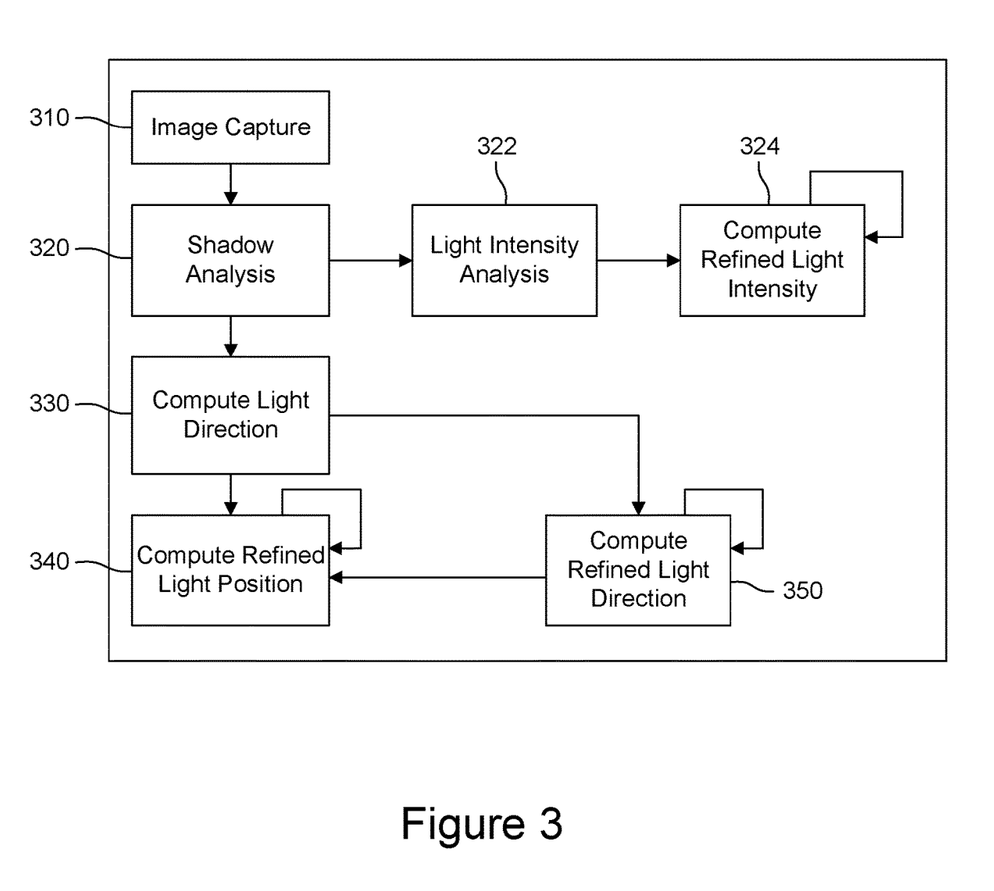
FIG. 3 is an illustration of a workflow according to one embodiment.

Regarding the intensity of a light, it is valuable to keep the individual estimates attached to a given light source, as the intensity typically varies with the distance to the light source. Alternatively, the estimated intensity values can be used to estimate an intensity function attached to the light source (as a $2^{nd}$ order polynomial for instance). For instance, in VRML, the attenuation is: ai=1/max(c1+c2×dL+c3×dL', 1)

c1, c2, c 3=light i attenuation
dL=distance from light to point on geometry, in light's coordinate system FIG. 3 provides a workflow for this process as per one embodiment. The image is captured at 310 and shadow analysis is performed at 320 which can include or lead to light intensity analysis 322. The refined light intensity is then computed in one environment as per 324. Light direction 330 and position 340 is also obtained and refined light direction is computed 350.

Figure 4:
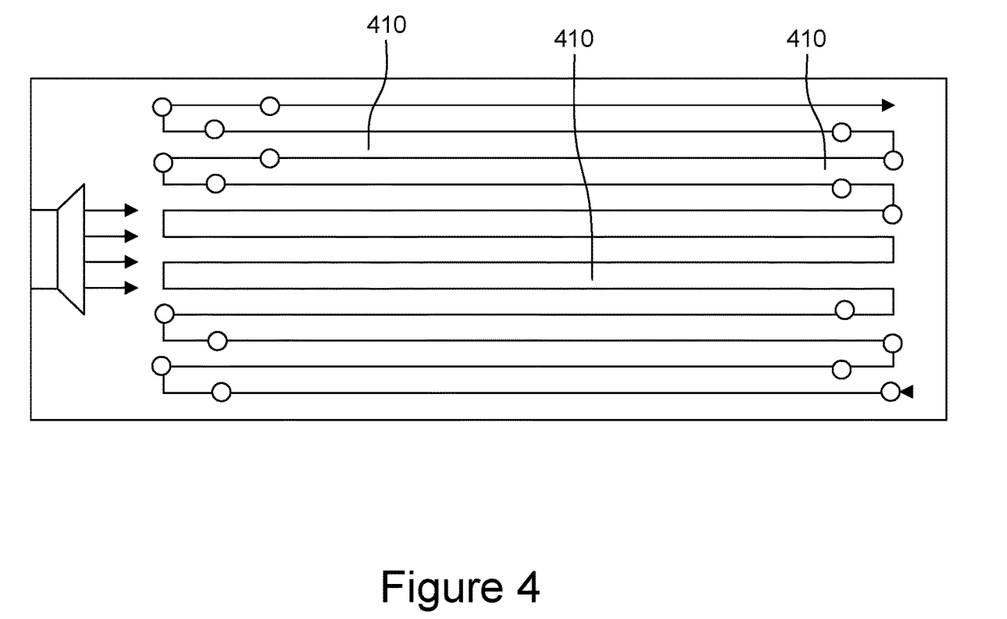
FIG. 4 is an illustration of a trajectory for the autonomous device according to one embodiment.
Figure 5:
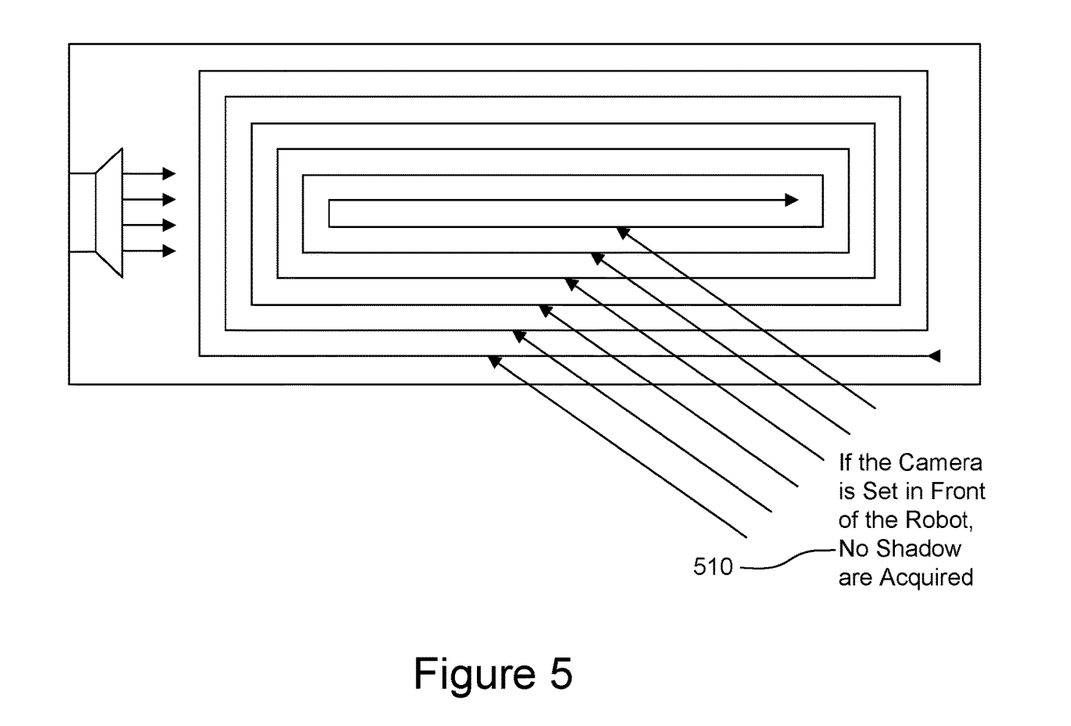
FIG. 5 is an illustration of a trajectory for the autonomous device according to another embodiment.
Figure 6:
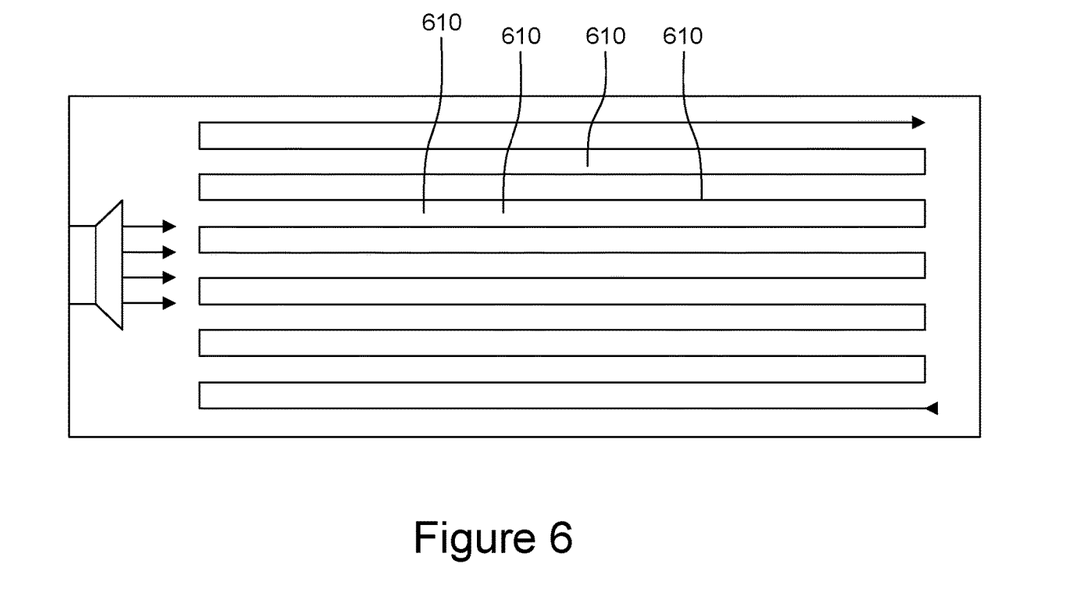
FIG. 6 is an illustration of a trajectory for the autonomous device according to another embodiment.
Figure 7:
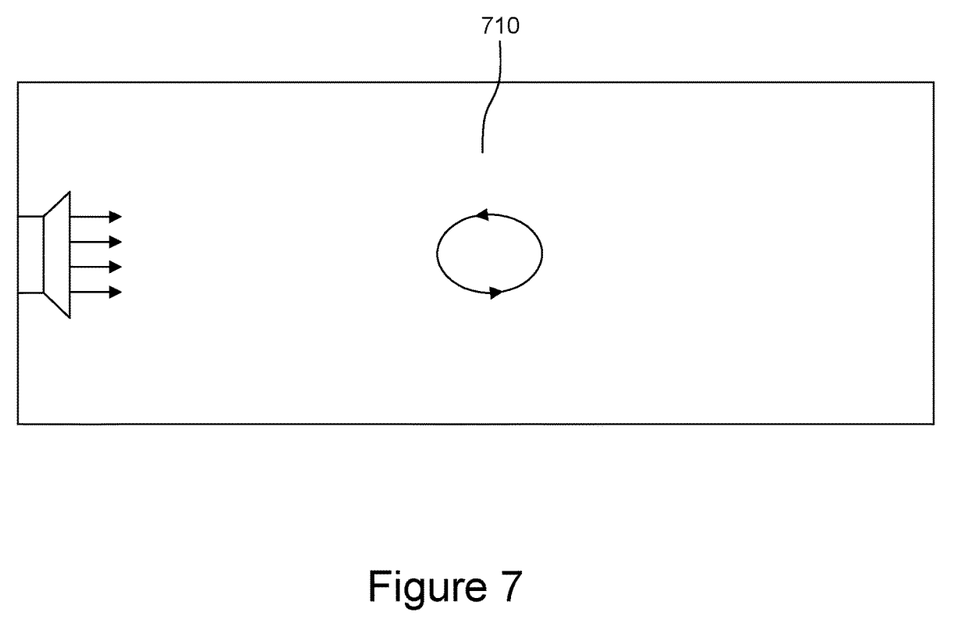
FIG. 7 is an illustration of a trajectory for the autonomous device according to yet another embodiment.

Depending on the camera number, camera position and light source characteristics, the trajectory of the robot will have an impact on the accuracy of the result. Some examples of these are provided in FIGS. 4 through 7. In FIG. 4, the positions of the robot and how it had moved is reflected at 410. In FIG. 5, the direction of light is shown at 510. FIG. 5 also reflects that if the camera is set in front of the robot, no shadows can be acquired. In FIG. 6 (similar to FIG. 4), the illustration shows how the trajectory can increase the accuracy of the result at 610. FIG. 7 is used to illustrate that to improve light estimation, moments of pure rotation can be inserted in the trajectory as shown at 710. At startup, a turn on itself would give a very rough estimate that could help to define a strategy.

Figure 8:
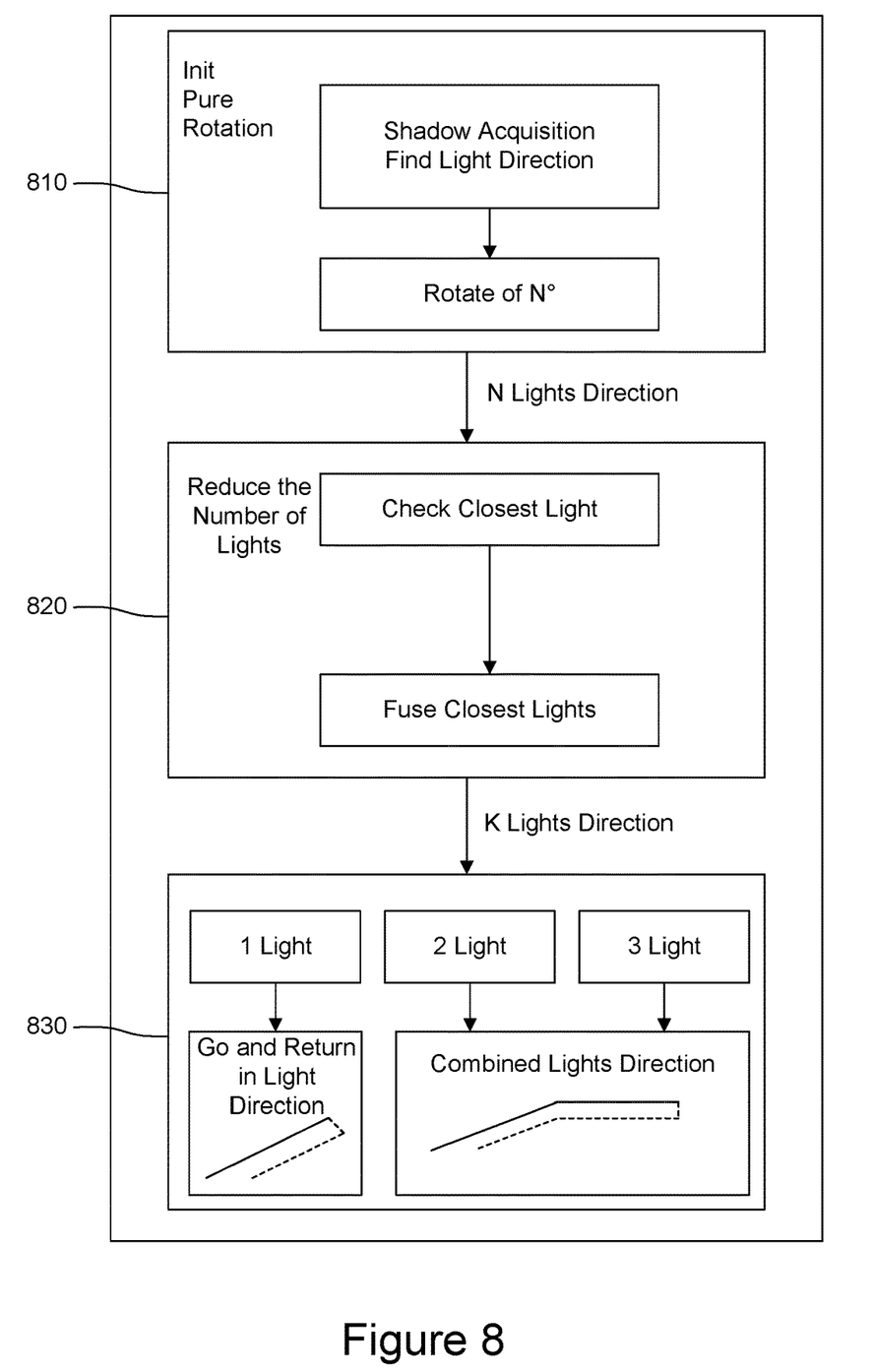
FIG. 8 is an illustration of an alternate workflow according to another embodiment.

FIG. 8 provides an exemplary embodiment of a workflow. As can be seen in the first block 810 the direction of light can be obtained by the variety of processes already discussed. This can include shadow acquisition and computation of rotation of the light and the robot. In the second block 820 the direction of the closest light is obtained such as by computation of a dot product (direction are closed if the result is closed to in block 1810). In block 2820, in one step there will be a fusion of the closest lights (the barycenter of the 2 closest directions is computed), the result is a new direction for the robot/autonomous device. In the third block 830, the shadow will be very strong when the robot is moving opposite to the direction of light. In this embodiment, the motion can be distributed in this trajectory (parallel to that of light—as much as possible) in the room to be analyzed. In one embodiment, the autonomous device or robot motion can be strategized to move back and forth in directions parallel to that of light. In cases where there is more than one light, to go from one edge to the other in the room, the robot will perform sections of the path parallel to the identified directions. Then it will do the reverse path to return (offset by its width).

In different embodiments, the autonomous device or robot can then be sent to a specific place on request to have an up-to-date light status. In one embodiment, to improve the result, the process can correlate collected info with external info like info from connected lights or time and weather information. Local occlusion can be bypassed with the displacement of the robot. The computation can be done locally on the robot or sent to a server.

For example, in one embodiment, directions from a 2D Point in the image to 3D direction of the point light in the scene can be surmised as known to those skilled in the art in the following manner for:

A linear case:
(x,y): 2D point
(x',y', 1): 3D direction of the corresponding point light in the linear case of intrinsic parameters
($c_x$,$c_y$,$f_x$,$f_y$): are the intrinsic parameters in the linear case:

Pinhole projection:

$$x' = \frac{(x - c_x)}{f_x}$$

$$y' = \frac{(y - c_y)}{f_y}$$

(With $c_i$=optical center, $f_i$=focal)
Non-linear case:

$$r = \sqrt{x'^2 + y'^2}$$

$r = \tan(\delta)$

Fisheye distortion:

$\theta_d = \theta * (1 + K_0\theta^2 + K_1\theta^4 + K_2\theta^6 + K_3\theta^8)$ (K=distortion coefficients)
To find θ:
Let f(θ) be the cost function:

$f(\theta) = \theta_d - \theta * (1 + K_0\theta^2 + K_1\theta^4 + K_2\theta^6 + K_3\theta^8)$  Equation 1

Applying the Newton Method [5] to solve Equation 1

$$x_{n+1} = x_n - \frac{f[(x)]_n}{[(f'(x)]_n}$$

$$\theta_{n+1} = \theta_n - \frac{f(\theta_n)}{f'(\theta_n)}$$

$$\theta_{n+1} = \frac{\theta_d + 2K_0\theta^3 + 4K_1\theta^5 + 6K_2\theta^7 + 8K_3\theta^9}{1 + 3K_0\theta^2 + 5K_1\theta^4 + 7K_2\theta^6 + 9K_3\theta^8}$$

(Initialization: θ=θ_d)
The distorted direction value coordinates is [$x_{3d}$; $y_{3d}$, $z_{3d}$] where $x' = (\theta d/r)x_{3d}$ $y' = (\theta d/r)y_{3d}$ Finally, change r by tan(θ)

$$x_{3d} = \frac{\tan(\theta)}{\theta d} * x'$$

$$y_{3d} = \frac{\tan(\theta)}{\theta d} * y'$$

$$z_{3d} = 1$$

Figure 9:
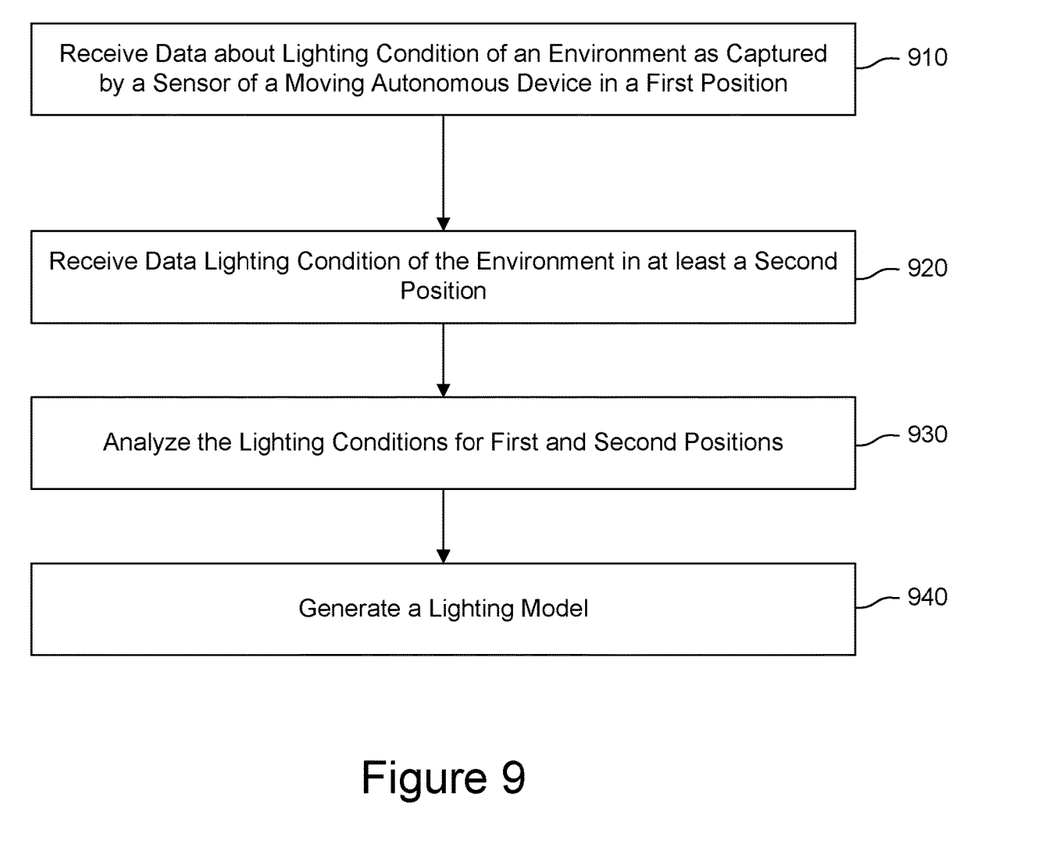
FIG. 9 is a flow chart illustration for generating a lighting model according to one embodiment.

FIG. 9 is a flowchart illustration of one embodiment. In one embodiment, as illustrated in S910, a method is provided for receiving data about lighting condition of an environment as captured by a sensor of a moving autonomous device in a first position. In S920, data is also received about lighting condition of the environment in at least a second position. The lighting conditions of the environment is then analyzed for each position in S930 and a lighting model is generated in S940 based on lighting of the environment in the different positions for the environment.

Figure 10:
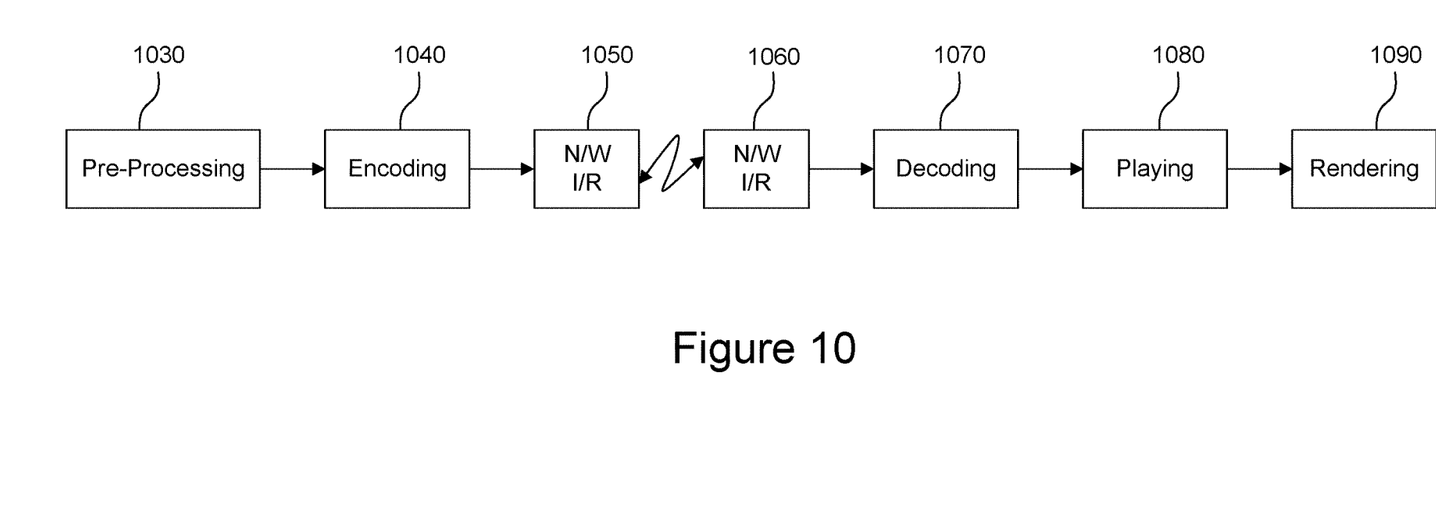
FIG. 10 is a schematic illustration of a general overview of an encoding and decoding system according to one or more embodiments.

FIG. 10 schematically illustrates a general overview of an encoding and decoding system according to one or more embodiments. The system of FIG. 10 is configured to perform one or more functions and can have a pre-processing module 1000 to prepare a received content (including one more images or videos) for encoding by an encoding device 1040. The pre-processing module 1030 may perform multi-image acquisition, merging of the acquired multiple images in a common space and the like, acquiring of an omnidirectional video in a particular format and other functions to allow preparation of a format more suitable for encoding. Another implementation might combine the multiple images into a common space having a point cloud representation. Encoding device 1040 packages the content in a form suitable for transmission and/or storage for recovery by a compatible decoding device 1070. In general, though not strictly required, the encoding device 1040 provides a degree of compression, allowing the common space to be represented more efficiently (i.e., using less memory for storage and/or less bandwidth required for transmission). In the case of a 3D sphere mapped onto a 2D frame, the 2D frame is effectively an image that can be encoded by any of image or video codecs. In the case of a common space having a point cloud representation, the encoding device may provide point cloud compression, which is well known, e.g., by octree decomposition. After being encoded, the data, is sent to a network interface 1050, which may be typically implemented in any network interface, for instance present in a gateway. The data can be then transmitted through a communication network 1050, such as internet but any other network may be foreseen. Then the data received via network interface 1060 may be implemented in a gateway, in a device. After reception, the data are sent to a decoding device 1070. Decoded data are then processed by the device 1080 that can be also in communication with sensors or users input data. The decoder 1070 and the device 1080 may be integrated in a single device (e.g., a smartphone, a game console, a STB, a tablet, a computer, etc.). In another embodiment, a rendering device 1190 may also be incorporated.

In one embodiment, the decoding device 1070 can be used to obtain an image that includes at least one color component, the at least one color component including interpolated data and non-interpolated data and obtaining metadata indicating one or more locations in the at least one color component that have the non-interpolated data.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for an autonomously movable device having a camera, the method comprising:
 moving to a first position in a scene relative to a light source, and capturing, at the first position, using the camera, a first image of a shadow of the autonomously movable device in the first position cast by the light source;
 moving to at least a second position in the scene relative to the light source and capturing, at the second position, using the camera, a second image of a shadow of the autonomously movable device in the second position cast by the light source;
 determining, features of the light source in the scene, the features comprising at least a position and an intensity of the light source at each of the first position and at least the second position; and
 determining a lighting model of the light source for the scene based on the features of the light source in the scene.

2. The method according to claim 1, comprising:
 creating shadows cast by virtual objects in an augmented reality view of the scene according to the determined lighting model of the light source in the scene.

3. The method according to claim 1, comprising an initial light source orientation determining step wherein rotating the autonomously movable device to determine, based on observation of a shadow of the autonomously movable device cast by the light source, a direction of the light source with regard to the autonomously movable device.

4. The method according to claim 1, wherein said lighting model is determined based on at least light direction and light intensity as determined at each of the first position and at least the second position.

5. The method according to claim 1, wherein the determining features of the light source in the scene is based on a correlation between a stored set of candidate shadow maps for the autonomously movable device and the first image of the shadow of the autonomously movable device cast in the first position by the light source and a correlation between the stored set of candidate shadow maps for the autonomously movable device and the second image of the shadow of the autonomously movable device cast in the second position by the light source.

6. An autonomously movable device having a camera, the autonomously movable device comprising at least one processor configured to:
 move the autonomously movable device to a first position in a scene relative to a light source, and capture, at the first position, using the camera, a first image of a shadow of the autonomously movable device in the first position cast by the light source;
 move the autonomously movable device to at least a second position in the scene relative to the light source and capturing, at the second position, using the camera, a second image of a shadow of the autonomously movable device in the second position cast by the light source;
 determine features of the light source in the scene, the features comprising at least a position and an intensity of the light source at each of the first position and at least the second position; and
 determine a lighting model of the light source for the scene based on the features of the light source in the scene.

7. The autonomously movable device according to claim 6, wherein the at least one processor is configured to create shadows cast by virtual objects in an augmented reality view of the scene according to the determined lighting model of the light source in the scene.

8. The autonomously movable device according to claim 6, wherein the at least one processor is configured to, in an initial light source orientation determining step wherein the at least one processor is configured to rotate the autonomously movable device, to determine, based on observation of a shadow of the autonomously movable device cast by the light source, a direction of the light source with regard to the autonomously movable device.

9. The autonomously movable device according to claim 6, wherein the at least one processor is configured to determine said lighting model based on at least light direction and light intensity as determined at each of the first position and at least the second position.

10. The autonomously movable device according to claim 6, wherein the at least one processor is configured to determine the features of the light source in the scene based on a correlation between a stored set of candidate shadow maps for the autonomously movable device and the first image of the shadow of the autonomously movable device cast in the first position by the light source and a correlation between the stored set of candidate shadow maps for the autonomously movable device and the second image of the shadow of the autonomously movable device cast in the second position by the light source.

11. A non-transitory computer-readable storage medium comprising a computer program product including instructions to cause at least one processor to:
  move an autonomously movable device having a camera to a first position in a scene relative to a light source, and capture, at the first position, using the camera, a first image of a shadow of the autonomously movable device in the first position cast by the light source;
  move the autonomously movable device to at least a second position in the scene relative to the light source and capturing, at the second position, using the camera, a second image of a shadow of the autonomously movable device in the second position cast by the light source;
  determine features of the light source in the scene, the features comprising at least a position and an intensity of the light source at each of the first position and at least the second position; and
  determine a lighting model of the light source for the scene based on the features of the light source in the scene.

12. The non-transitory computer-readable storage medium according to claim 11, wherein the computer program product further including instructions to cause the at least one processor to create shadows cast by virtual objects in an augmented reality view of the scene according to the determined lighting model of the light source in the scene.

13. The non-transitory computer-readable storage medium according to claim 11, wherein the computer program product further including instructions to cause the at least one processor to rotate the autonomously movable device, to determine, based on observation of a shadow of the autonomously movable device cast by the light source, a direction of the light source with regard to the autonomously movable device.

14. The non-transitory computer-readable storage medium according to claim 11, wherein the computer program product further including instructions to cause the at least one processor to determine said lighting model based on at least light direction and light intensity as determined at each of the first position and at least the second position.

15. The non-transitory computer-readable storage medium according to claim 11, wherein the computer program product further including instructions to cause the at least one processor to determine the features of the light source in the scene based on a correlation between a stored set of candidate shadow maps for the autonomously movable device and the first image of the shadow of the autonomously movable device cast in the first position by the light source and a correlation between the stored set of candidate shadow maps for the autonomously movable device and the second image of the shadow of the autonomously movable device cast in the second position by the light source.

* * * * *